UNITED STATES PATENT OFFICE.

SIMON J. LUBOWSKY, OF JERSEY CITY, NEW JERSEY, ASSIGNOR TO METAL & THERMIT CORPORATION, OF CHROME, NEW JERSEY, A CORPORATION OF NEW JERSEY.

PROCESS FOR THE RECOVERY OF TUNGSTEN TRIOXIDE FROM TUNGSTEN ORES AND THE LIKE.

1,410,584.  Specification of Letters Patent.  Patented Mar. 28, 1922.

No Drawing.  Application filed January 26, 1920.  Serial No. 354,226.

*To all whom it may concern:*

Be it known that I, SIMON J. LUBOWSKY, a citizen of the United States, and resident of Jersey City, in the county of Hudson and State of New Jersey, have invented a certain new and useful Process for the Recovery of Tungsten Trioxide from Tungsten Ores and the like, of which the following is a specification.

The invention relates to a novel and efficient process for the production and recovery of tungsten values, and especially tungsten trioxide from ores, concentrates, and other materials containing the metal tungsten.

The principal object of the invention is to provide an economical mode of recovering high grade and substantially pure tungstic acid, suitable for use in the preparation of metallic tungsten powder.

In carrying out the invention, the following procedure is found efficacious and economical. The ore, or other material containing the tungsten, is roasted, together with a mineral salt, preferably a chloride or a chlorate of an alkali metal or an alkaline earth metal, such for example, as calcium chloride, sodium chloride, or potassium chlorate, the calcining being effected at a bright red heat, preferably at approximately 1700° F. The roast is then preferably pulverized or effectively broken up and treated for an appropriate time, depending upon the character of the ore or tungsten-bearing material, with a fairly concentrated mineral acid, such as sulphuric, nitric, or hydrochloric acid. As a result of this treatment a large percentage of the original impurities of the ore go into solution, which is separated from the solid residue, and the latter which contains the tungsten values is washed and extracted with an ammoniacal liquor or solution, such as aqua ammonia, or a solution of ammonium carbonate, preferably at about 40° C. The resulting solution is then separated and the ammonia is distilled off and recovered by any well known method. The residue from the distillation is then preferably calcined at a dull red heat to drive off the last traces of ammonia leaving the residue as a high grade substantially pure tungsten trioxide.

The residue from the extraction with the ammoniacal liquor may be re-treated, as hereinbefore described, first with a mineral acid and subsequently with an ammoniacal liquor, for the purpose of recovering any residual tungsten values, and this treatment may be repeated as often as found necessary.

What I claim is:

The process for the recovery of tungsten values from material containing tungsten, which comprises roasting the material with a haloid salt of an alkaliferous metal, digesting the roast with a mineral acid, and separating the solid residue.

Signed at Jersey City, in the county of Hudson, and State of New Jersey, this 19th day of January, A. D. 1920.

SIMON J. LUBOWSKY.